Nov. 20, 1962
E. ENK ETAL
3,065,062
PROCESS FOR PURIFYING AND RECRYSTALLIZING
METALS, NON-METALS, THEIR
COMPOUNDS OR ALLOYS
Filed June 1, 1959
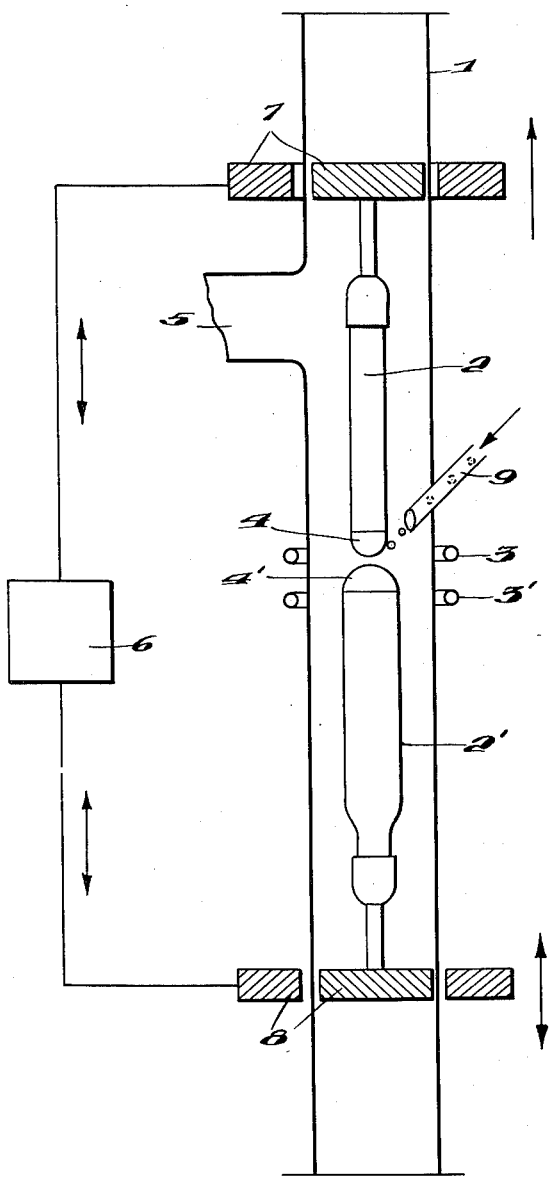
INVENTORS
EDUARD ENK,
JULIUS NICKL,
BY
ATTORNEYS 3,065,062
PROCESS FOR PURIFYING AND RECRYSTALLIZING METALS, NON-METALS, THEIR COMPOUNDS OR ALLOYS
Eduard Enk and Julius Nickl, Burghausen, Upper Bavaria, Germany, assignors to Wacker-Chemie G.m.b.H., Munich, Germany
Filed June 1, 1959, Ser. No. 817,106
Claims priority, application Germany June 3, 1958
1 Claim. (Cl. 23—301)

The present invention relates to an improved process for purifying, recrystallizing and forming of metals, non-metals, their compounds or their alloys.

It is an object of the invention to provide a simple, effective and comparatively rapid method for purifying, recrystallizing and forming of solid fusible materials, particularly those containing impurities which are more volatile than the material to be purified.

In the improved process according to the invention, a small quantity of the solid metals, non-metals, their compounds or alloys which are to be purified and processed are fused at pressures down to $10^{-6}$ mm. Hg and lower, the impurities are permitted to evaporate from such fused small quantity, and such small fused quantity is then removed from the non-fused portion and applied to a single crystalline, polycrystalline or liquid support and permitted to solidify on such support, all of such procedures taking place without contact with the walls of the container or crucible in which the fusion and resolidification take place.

The accompanying drawing shows one form of an apparatus suitable for carrying out the process according to the invention.

Referring to such drawing, rod or tube 2 which is mounted for vertical movement is magnetically supported in quartz glass vessel 1. At least the lower end of such rod or tube consists of the material to be purified. The lowermost end of such rod or tube is melted with the aid of high frequency heater 3 to form a drop 4 which is subjected to the vacuum in vessel 1 maintained over vacuum line 5. After about 10 seconds to 5 minutes or longer, the molten drop is deposited on the upper surface of rod 2' which preferably is of the same material as is being purified and preferably prepurified. Care is taken with the aid of high frequency heater 3' that the molten cap 4' formed on the lower rod does not solidify immediately but rather remains molten thereon for 10–30 seconds in order that impurities may further evaporate therefrom. This procedure is repeated until the upper rod is consumed. The adjustment of the height of the upper and lower rods is effected with the aid of apparatus 6 and magnets 7 and 8. The heat required can be supplied by one or more high frequency coils.

It is possible in this way, for example, to melt and reform rods of a diameter of 3–30 mm. in a relatively short period of time and effect extensive purification thereby.

When 2 is a tube the lower fused zone formed thereon can be in the form of a coalesced drop or of a fused annulus. In the latter instance it is possible to apply such fused annulus to a lower solidifying fused annulus. It is possible in this way to produce remelted and purified tubes without having the fused material come into contact with a container wall.

The walls of vessel 1 can be cooled with compressed air or water.

In the purification of some materials it can be of advantage to operate in a purifying gas atmosphere which flows through the purification apparatus to remove the impurities which are volatilized. In some instances when materials are to be purified which easily vaporize or decompose it may be necessary to operate at a superatmospheric pressure corresponding to the vapor pressure thereof.

The purification can, if desired, be repeated a number of times. In such instance the lower rod obtained during the first purification is placed in the upper position and small quantities of the lower end thereof again melted and purified to a lower rod. It is also possible to operate the purification process in reverse, that is, to fuse small quantities of the upper end of the lower rod and to pull off molten drops with the upper rod.

It is material for the process according to the invention that the volatilized impurities are either precipitated on cooled walls of the container in which the fusion and resolidification of the material being purified takes place or that such impurities are withdrawn or pumped out of such container, as otherwise they may re-evaporate and be re-incorporated in the upper or lower rod.

The process according to the invention can also be employed to remelt rods of non-uniform cross-section. For example, it is possible to insert a rod having a diameter of 10–35 mm. as the upper rod and to form a lower rod of a diameter of about 15 mm. It is also possible that the upper rod to be purified be of smaller diameter than the lower purified rod which is produced therefrom.

The process according to the invention can also be used for the melting and purification of granular material without it being necessary that it first be converted into rods or tubes. For this purpose a pure rod of the material to be purified is inserted as the upper rod and the lower tip thereof melted. Then individual granules of the material to be purified are supplied through supply conduit 9 to such molten tip and melted. During such fusion the impurities contained in the granules supplied evaporate and are deposited on the cooled container walls or are removed from such container. When the molten tip is of suitable size, it is possible repeatedly to deposit that portion derived from the granules supplied thereto on a lower rod and effect further evaporation of impurities thereon, without consuming any material portion of the upper rod.

It is advantageous for the rapid and satisfactory progress of the process according to the invention that the movement of the upper and lower rods or bodies be regulated and controlled automatically.

The process according to the invention is not only suitable for conversion of prepurified material into highly pure material but also for purification, remelting and forming of non-prepurified material.

The process according to the invention can be employed to purify almost all metals and alloys as long as they do not rapidly evaporate under the conditions of the process. Non-metals can also be purified by the process. It is furthermore suited for the remelting and purification of strongly polar salts and other compounds which are stable upon fusion. Organic substances can also be purified in this manner. In the latter instance, it is advantageous to employ ultra red irradiation or hot gases as a source of heat.

Ion electron bombardment, as well as one or more electron torches, are also suited as sources of heat.

The process according to the invention is also suited for the production of single crystal shaped bodies if the fused material being purified is deposited in a single crystal, the surface of which has been melted and is permitted to solidify slowly thereon.

The dripping off of the fused portions produced according to the invention can be assisted by changing the surface tension of the drop, for example, by application of an electric potential. Also, oscillations and shocks of well controlled intensity can also be used to cause drops of the fused portion to drop off. It is also possible to stabilize the drop and the lower fused zone to prevent premature separation with electromagnetic fields.

The following examples will serve to illustrate several embodiments of the process according to the invention.

*Example 1*

An apparatus was employed which substantially corresponded to that shown in the drawing. The vessel 1 was of quartz containing a moderate amount of bubbles and was provided with an inlet conduit 9 over which material to be purified could be supplied (not employed in this example). A floating magnet was employed for adjusting upper body 2 and the arrangement for adjusting the height of the lower body 2' was over a fixed spindle on which a nut could move up and down. The lower body was fastened to this nut in a holder of molybdenum and stainless steel. A round polycrystalline n-conductive silicon rod 15 mm. in diameter and 1 meter long was inserted in the apparatus as the upper body. A round single p-conductive crystal silicon rod 60 m. long of 111 orientation in the direction of the rod axis was employed as the lower body. The upper end of the latter rod was 16 mm. in diameter and its lower end 14 mm. in diameter.

The apparatus was closed and evacuated with a mercury high vacuum pump over vacuum conduit 5 in its upper end to provide a pressure of $10^{-6}$ to $10^{-7}$ mm. Hg. This pressure was maintained during all of the following operations. As soon as such pressure was reached, a drop was melted on the lower end of the upper rod with the aid of high frequency coil 3 surrounding vessel 1 using a frequency range of 1–2.5 mHz. The upper rod with the adhering molten drop was then moved downwardly and about 75% of the molten drop transferred to the upper end of the lower rod. From this moment on high frequency coil 3' which was operated at a frequency of 4–6 mHz. was active to ensure that the liquid silicon applied to the lower rod did not immediately solidify but rather came into intimate contact with the solid material of the lower rod, that is, that no solidified layer occurred on the lower side of the applied liquid silicon. High frequency coil 3' assured that a moderate temperature gradient was maintained in the molten zone on the upper end of the lower rod and that a satisfactory single crystal growth was possible. When this procedure was followed it was inherent that also a small portion of the upper end of the lower rod was fused by high frequency coil 3' at the beginning of the process.

It was also possible to prefuse the upper end of the lower rod to provide a fused zone at the upper end thereof before the fused material was deposited thereon from the upper rod. In this instance the fused material from the upper rod was slowly deposited in portions on the melted cap on the lower rod.

Several seconds after the liquid portion was deposited from the lower end of the upper rod upon the upper end of the lower rod or the fused zone resting thereupon in which a perfect transition from the solid portion to the liquid zone took place, the lower rod was continuously withdrawn downwardly at a velocity of 2 mm. per minute.

The fused zone of the lower rod solidifies upwardly slowly from the liquid solid boundary surface. Nevertheless, during the entire course of the process a fused zone 3–4 mm. high is maintained. As soon as a sufficient quantity of silicon had again melted at the lower end of the upper rod, it was again deposited on the fused zone already existing on the lower rod. This procedure could be repeated until the upper rod was consumed.

The walls of the quartz vessel in the region of the heating zones were cooled with running water.

It was possible to produce a single crystal p-conductive silicon rod 16±0.2 mm. in diameter and 50 cm. long in this manner. When this piece of rod 16 mm. in diameter had been produced, the heat output of coil 3' was diminished slightly and the velocity at which the lower rod was withdrawn slowly gradually increased to 3 mm. per minute. In this manner a conical upper end 50 mm. long having an upper diameter of 12 mm. was provided on the upper end of the rod.

We claim:

A method for purifying and recrystallizing silicon containing impurities more volatile than silicon to produce a single crystal silicon rod therefrom which comprises the following steps: (1) melting the upper free standing end of a single crystal silicon rod with electrical high frequency heating in a vessel maintained at a pressure between $10^{-6}$ and $10^{-7}$ mm. Hg.; (2) melting the lower end of a free hanging rod of the silicon to be purified and recrystallized disposed in such vessel above the free standing single crystal silicon rod with electrical high frequency heating to produce an adhering free hanging molten silicon drop on the lower end thereof; (3) moving the upper rod with the adhering molten drop downwardly to contact the melted upper end of the lower rod and transfer about 75% of the molten drop carried by the upper rod to the melted upper end of the lower rod; (4) after transfer of such portion of the molten drop on the upper rod to the melted upper end of the lower rod continuously withdrawing the lower rod downwardly at a velocity of about 2 mm. per minute while permitting the melted upper end of the lower rod to solidify upwardly from the liquid solid boundary surface while still maintaining a melted zone at the upper end of such lower rod and (5) sequentially repeating steps 2 and 3 to transfer further quantities of silicon melted at the lower end of the upper rod to the melted upper end of the lower rod.

References Cited in the file of this patent

UNITED STATES PATENTS

| | | |
|---|---|---|
| 2,686,864 | Wroughton et al. | Aug. 17, 1954 |
| 2,688,169 | Gruber et al. | Sept. 7, 1954 |
| 2,771,357 | Wroughton | Nov. 20, 1956 |
| 2,850,372 | Planiol | Sept. 2, 1958 |
| 2,866,700 | Bohnet | Dec. 30, 1958 |
| 2,880,483 | Hanks | Apr. 7, 1959 |

FOREIGN PATENTS

| | | |
|---|---|---|
| 551,102 | Canada | Dec. 31, 1957 |